No. 850,230. PATENTED APR. 16, 1907.
J. M. KIEHLE.
PIPE CONNECTION.
APPLICATION FILED OCT. 31, 1905.
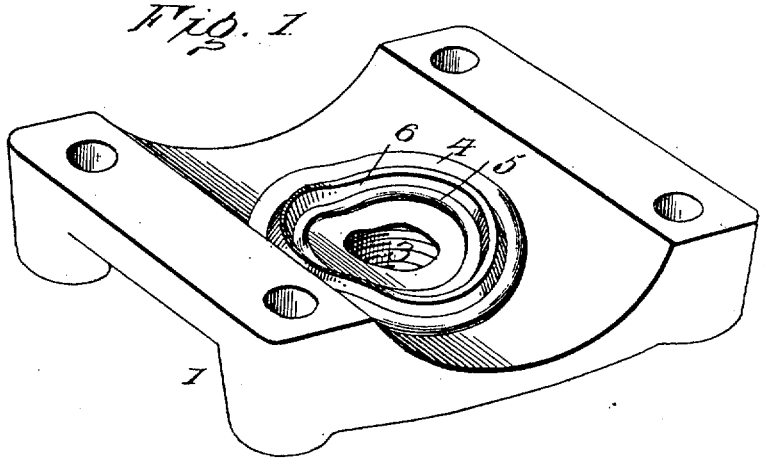
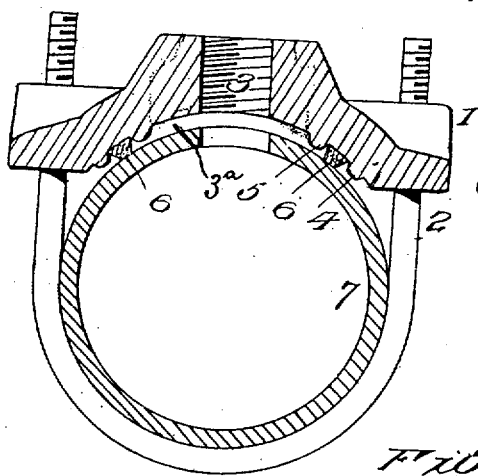
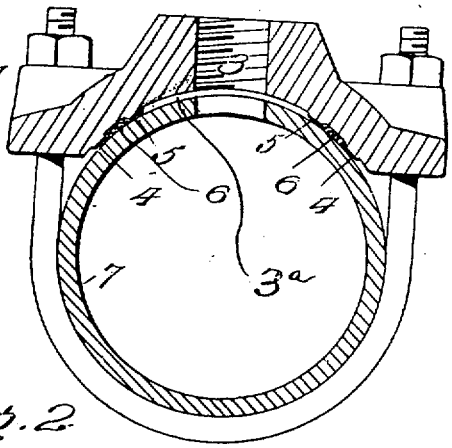
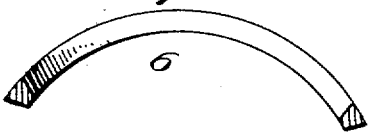
Witnesses
Inventor
J. M. Kiehle

UNITED STATES PATENT OFFICE.

JAMES M. KIEHLE, OF COUDERSPORT, PENNSYLVANIA, ASSIGNOR OF ONE-THIRD TO ALBERT A. MULKIN AND ONE-THIRD TO W. H. RICHARDS, OF COUDERSPORT, PENNSYLVANIA.

PIPE CONNECTION.

No. 850,230.    Specification of Letters Patent.    Patented April 16, 1907.

Application filed October 31, 1905. Serial No. 285,333.

*To all whom it may concern:*

Be it known that I, JAMES M. KIEHLE, a citizen of the United States, residing at Coudersport, in the county of Potter and State of Pennsylvania, have invented certain new and useful Improvements in Pipe Connections, of which the following is a specification.

In tapping pipe-lines, particularly such as are used for conveying natural gas, to connect a branch or lateral therewith a fitting or connection, designated as a "saddle," is used, the same being clipped to the main line and the branch coupled to the saddle. A tight joint is obtained between the saddle and the main pipe to prevent leakage by the interposition of a washer or suitable packing, either of metal, leather, rubber, or other suitable material. This packing is frequently blown out by the high pressure, entailing loss and serious inconvenience.

The purpose of the present invention is to prevent displacement or blowing out of the packing, and to this end the hollow or seating side of the saddle is formed with concentric confining-ribs to encircle or otherwise engage with and prevent displacement of the packing.

For a full description of the invention and the merits thereof and also to acquire a knowledge of the details of construction of the means for effecting the result reference is to be had to the following description and accompanying drawings, in which—

Figure 1 is a perspective view of the saddle inverted, the packing being omitted. Fig. 2 is a longitudinal section of the packing. Fig. 3 is a sectional detail of the saddle and packing, showing the relation of the parts preliminary to the application of force for clamping the saddle to the pipe. Fig. 4 is a view similar to Fig. 3, showing the relation of the parts after the saddle has been clamped and the packing spread and conformed to the space between the confining-ribs, saddle, and pipe.

Corresponding and like parts are referred to in the following description and indicated in all the views of the drawings by the same reference characters.

The saddle fitting or connection 1 may be of ordinary construction, depending upon the size of pipe for which it is intended and the particular nature of the work. This saddle is adapted to be secured to the pipe by means of clips 2, or other suitable fastenings, the same passing through reinforced openings provided in edge portions of the saddle. The pipe to be coupled to the main line is fitted into the opening 3 and is secured in place either by screw-threads or in any other desired way. The inner or seating face of the saddle is made hollow or concave to conform to the periphery of the main pipe and is provided with concentric confining-ribs 4 and 5, the purpose of which is to prevent lateral displacement of the packing preferably in an outward direction. Between these ribs a packing 6 is adapted to be secured. The outer confining-rib 4 prevents the packing 6 from being blown outward when said packing is subjected to great internal pressure. By providing concentric confining-ribs the lateral expansion of the packing is limited when subjecting the saddle to pressure, as when clamping it to the main line or other pipe to which it is to be attached. The confining-ribs constitute a part of the saddle, and their sides slope in opposite directions, so that the space between the ribs is flared, as shown.

The packing 6 may be of lead or other soft metal or may be formed of rubber, leather, or other suitable material. As shown in Fig. 2, the packing is curved to conform to the hollow side of the saddle and is approximately of V form in cross-section. The packing is of a size to comfortably fit the confining-ribs, and its V or wedge form enables the narrow edge to come in contact with the side of the pipe to which the saddle is to be coupled. The base of the packing is flat to fit square against the flat portion of the saddle coming between the ribs 4 and 5. In practice the main pipe 7 after being tapped has the packing and saddle fitted thereto, as indicated in Fig. 3, the packing projecting to some distance beyond the confining-ribs. Upon tightening the clips or other fastening employed for clamping the saddle to the pipe the packing 6 is compressed and expands laterally and fills the space formed between the confining-ribs and at the same time conforms to the surface of the pipe 7, thereby preventing any possible leak. The ribs 4 and 5 limit the lateral or transverse expansion of the packing and in practice prevent lateral displacement thereof either inward or outward, the latter being of advantage, inasmuch at it prevents blowing out of the packing when subjected to high internal pressure.

The arrangement of the clips 2, whereby the same are located just beyond diametrically opposite points in the circular ribs 4 and 5, is advantageous, in that an even pressure is caused to be exerted upon the packing 6 throughout the area of the latter. The effectiveness of the packing is thus promoted to a maximum extent, and, furthermore, the rigidity of attachment of the saddle to the pipe 7 is subserved.

From the foregoing it will be understood that the invention provides simple and effective means for retaining the packing of a pipe coupling or fitting in proper position against pressure from within and at the same time limits the transverse expansion of the packing when clamping the fitting to the pipe, thereby preventing disintegration or overstraining thereof, which would be the case if no limit were placed upon the compression of the packing.

By forming the concentric ribs 4 and 5 outstanding from the inner face of the saddle it will be seen, noting particularly Fig. 4 of the drawings, that a space $3^a$ is produced within the circle of the inner rib 5. By this arrangement and construction it is manifest that even though by careless handling the tap-opening of the main pipe 7 should not register exactly with the opening 3 in the saddle, and, further, should the opening that is tapped in the pipe 7 chance to be larger in diameter than the opening 3 in the saddle, yet no disadvantageous results will ensue because of the space $3^a$ within the innermost rib. Consequently the pressure of the gas or other fluid escaping from the pipe 7 would be relieved by means of this space $3^a$, leading into the opening 3, and therefore undue pressure upon the under side of the saddle where it surrounds the opening 3 would be avoided, which would not be the case if the ribs 4 and 5 did not stand out from the saddle and the inner face of the saddle were to lie snugly against the outer periphery of the main pipe 7.

Having thus described the invention, what is claimed as new is—

A pipe connection, comprising a saddle provided with a concave inner side to conform to the peripheral portion of the pipe and having an opening extending therethrough centrally of said concave portion, the concave portion of the saddle being formed with two spaced-apart concentric ribs surrounding the opening therein and outstanding from the concave surface, said ribs having their sides sloping in opposite directions, whereby to produce a flared space between them, a packing-ring received between said ribs and initially substantially V-shaped in cross-section, with a flat base, and clips adapted to receive the pipe therein and arranged to clamp the saddle to said pipe, so as to flatten the packing-ring to fill the space between the said outstanding ribs, the inner one of said ribs producing a space $3^a$ leading into the opening in the concaved portion of the saddle, as and for the purpose set forth.

In testimony whereof I affix my signature in presence of two witnesses.

JAMES M. KIEHLE. [L. S.]

Witnesses:
F. A. FRENCH,
HOWARD WHITE.